United States Patent [19]

Stankewitz et al.

[11] 3,930,713
[45] Jan. 6, 1976

[54] INCIDENT LIGHT ILLUMINATION INSTRUMENT FOR SELECTIVE LIGHT AND DARK FIELD ILLUMINATION

[75] Inventors: Hans-Werner Stankewitz, Steindorf; Hans Determann, Nauborn, both of Germany

[73] Assignee: Ernst Leitz G.m.b.H., Wetzlar, Germany

[22] Filed: May 28, 1974

[21] Appl. No.: 473,818

[30] Foreign Application Priority Data
June 22, 1973 Germany............................ 2331750

[52] U.S. Cl. .................... 350/89; 350/91; 350/236; 350/237
[51] Int. Cl.² ........................................ G02B 21/10
[58] Field of Search ............... 350/89, 91, 236, 237

[56] References Cited
UNITED STATES PATENTS
1,943,510   1/1934   Bauersfeld et al. .................... 350/89

Primary Examiner—John Kominski
Attorney, Agent, or Firm—Gilbert L. Wells

[57] ABSTRACT

An incident light illumination device or instrument for generating dark and light field illumination, wherein at least one optical component is used in a region where the dark field and the light field illumination beams are kept in separate zones. The inner zone is traversed by the light field beam and is endowed with an index of refraction other than the outer zone which is traversed by the dark field beam. A switchable stop for eliminating the light field beam is provided in the vicinity of the optical component (s). The index of refraction of the inner zone of at least one optical component is selected so that the light source is reproduced in the rear focal plane of a microscope objective. A mirror designed as a rotating body and reflecting from its inside surface is located in the optic path from the optic component to the microscope objective and this mirror solely reproduces the dark field beam as a light ring in a plane on the rear side of the microscope objective.

6 Claims, 3 Drawing Figures

INCIDENT LIGHT ILLUMINATION INSTRUMENT FOR SELECTIVE LIGHT AND DARK FIELD ILLUMINATION

CROSS REFERENCES TO RELATED APPLICATIONS

Applicants claim priority under 35 U.S.C. 119 for application Ser. No. 2 331 750.2, filed June 22, 1973 in the Patent Office of the Federal Republic of Germany.

The disclosure of application Ser. No. 428,664, filed Dec. 27, 1973, and having the same assignee as the present application is incorporated herein. Application Ser. No. 428,664 discloses the state of the art of bright field and dark field microscopy and makes use of the bright field and dark field illumination heads of Swiss Pat. No. 236,262, which are also useful in the present application.

BACKGROUND OF THE INVENTION

The invention relates to an illumination instrument for generating light and dark field illumination wherein an optical component is mounted in one area where the bundles of rays for light field and dark field illumination pass separately through different zones. This component has a different index of refraction in the inner zone that is traversed by the light field bundle than in the outer zone that is traversed by the dark field bundle. A stop that is switchable is provided in the vicinity of the component in order to suppress the light field bundle or beam.

Instruments known to date and related to incident light dark and light field illumination and of the design disclosed above and in German Published Application No. 2,021,784 so far have been designed and built only as accessory components to microscopes equipped with revolving objective nosepieces, or, as regards special microscopes, they are solidly built into the objective nosepiece.

Attempts have recently been undertaken to equip small single microscopes also with supplementary incident light illumination devices. However, because of design bulk requirements it has proved possible so far to create only light field incident light illumination. To that end, an appropriate device was locked between the ocular tube and the saddle bracket. The dark field beam which necessarily is made to pass outside the microscope objective, could not be made to pass by means of the previously known imaging methods for a dark field through the apertures present in the saddle bracket and in the fixed objective nose.

The invention therefore has as an objective the problem of creating an incident light illumination device or instrument by means of which a dark field beam may be made to pass through a relatively elongated and narrow cylindrical aperture above a microscope objective.

SUMMARY OF THE INVENTION

Having in mind the limitations of the prior art, an incident light illumination device or instrument of the initially mentioned kind, wherein the index of refraction of the inside zone of the optical component is selected so that the light source is reproduced in the rear focal plane of a microscope objective, a body acting as a mirror on its inside surface is provided and located in the optical path between the optical component and the microscope objective. This is designed as a rotating body and projects exclusively the dark field beam as a light ring onto a plane of the rear side of the microscope objective. This reflecting rotating body may be in the shape of an ellipsoidal segment, one of the foci being located in the region of the outer zone of the optic component and the axis of rotation being the optical axis of the illumination device. The ellipsoidal segment may be approximated by a circular one.

The present invention is based on the following consideration: a mirror formed by an ellipsoidal segment projects one focus into the other. When this mirror is made to rotate about an axis which is parallel to the major axis of the ellipsoidal segment, an annular ellipsoidal mirror is obtained. The foci of the ellipsoidal mirror are located symmetrically to the minor axis of the ellipsoidal segment on two circles.

If, therefore, the optical axis of the mirror is selected as the rotational axis, the annular mirror forms a light ring which is selected as the rotational axis, the annular mirror forms a light ring which is concentric with the optical axis and contains one of the focal circles, this light ring being projected into the plane containing the other focal circle.

BRIEF DESCRIPTION OF THE DRAWING

An embodiment of the invention is schematically shown in the drawing and described as follows.

DESCRIPTION OF THE PREFERRED EMBODIMENTS

Figure 1:
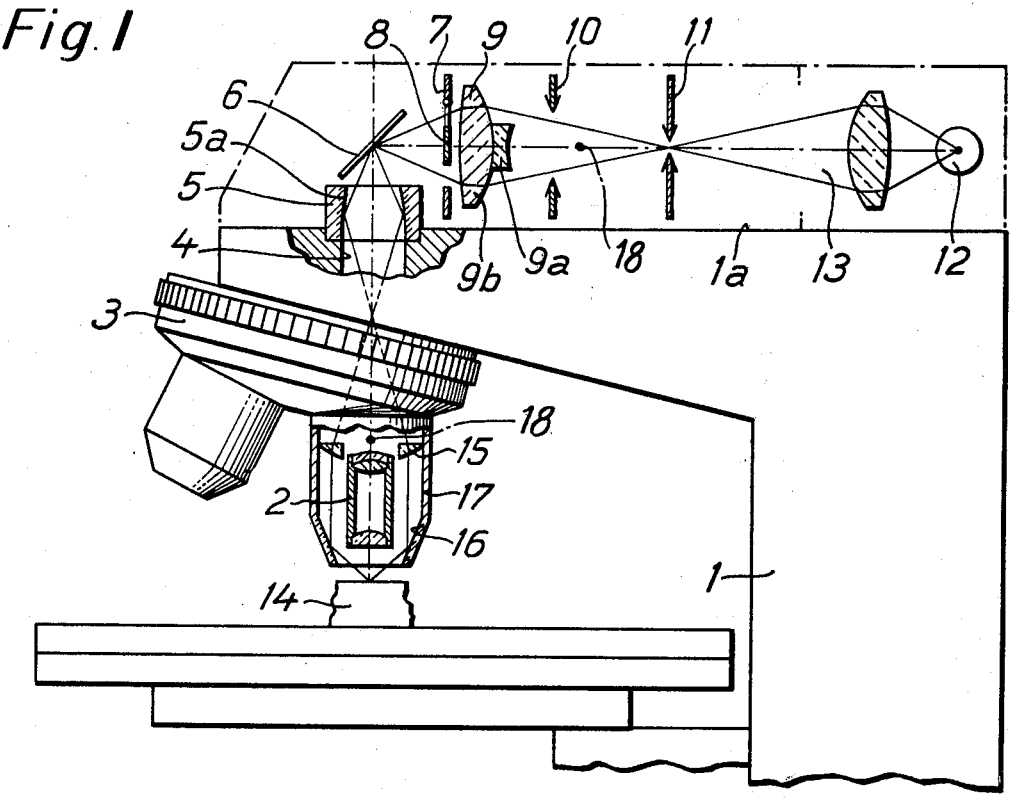
FIG. 1 shows the dark field beam passing through an aperture of the device or instrument clamped between the ocular tube and the microscope saddle bracket.

A microscope saddle bracket 1 is shown in FIG. 1 which is connected with a revolving nosepiece 3 holding objective 2 and provided with a bore 4 allowing passage to the light beam from objective 2 along optical axis 18. An illumination device or instrument is clamped above objectives 2 to the surface 1a of saddle bracket 1 and below the ocular tube. The tube is not shown in greater detail. The device consists of an annular mirror 5, a splitting mirror 6, an annular diaphragm 7 with a center stop 8 that may be swung in and out; and a controllable radiant field stop 10 as well as an aperture stop 11 of variable diameter. Lamp 12 mounted near the illumination device or instrument serves as the light source.

Figure 2:
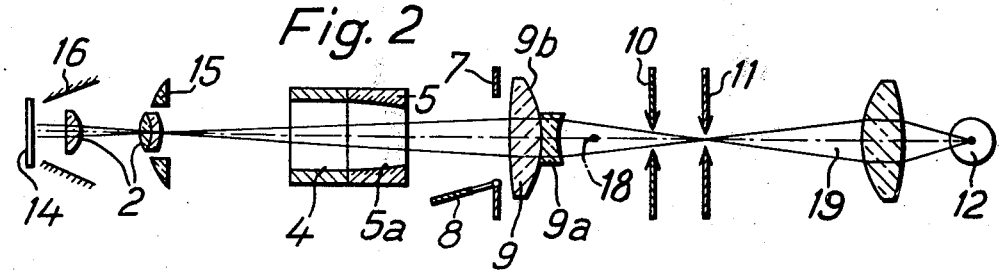
FIG. 2 shows the light field optical path.

The light field illumination disclosed in FIG. 2 involves a light beam 19 emitted by lamp 12 and passing through aperture stop 11 and radiant field stop 10. This light beam, after crossing the inner zone 9a of optical component 9 supporting to the rear or in front of the annular diaphragm 7 with swung-out center stop 8, is guided from splitting mirror 6, as in FIG. 1, through annular mirror 5 of the illumination device and through bore 4 in the saddle bracket, via objective 2 to object 14.

Figure 3:
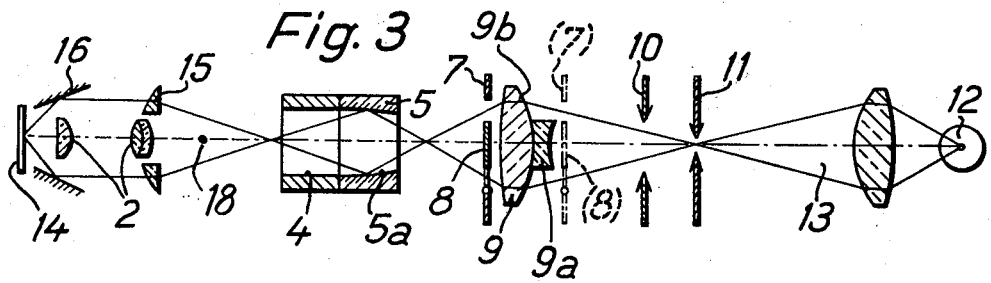
FIG. 3 shows the dark field optical path.

As regards dark field illumination (FIG. 3), the light beam 13 emitted by lamp 12 passes through aperture stop 11 and the fully open radiant field stop 10, being then incident upon optic component 9 to the rear or front of which is mounted annular diaphragm 7. This diaphragm by means of swung-in center stop 8 allows only those parts of light beam 13 to be transmitted (to the splitting mirror 6 of FIG. 1) which cross the outer zone 9b of the optical component 9, which are required for the dark field illumination. Thence the deflection proceeds toward the annular mirror, of which the inside surface 5a relfects those parts of light beam 13 to an annular lens 15 mounted around objective 2. This annular lens collimates the divergent parts of the light beam and guides them to a reflection surface 16 of sleeve 17 surrounding objective 2 and annular lens 15 (FIG. 1). The light beam parts are then deflected in order to illuminate object 14.

Obviously any other optic component such as an annular prism for instance may be used in lieu of the annular lens 15.

The combination of the lens system 9 with the reflection apparatus 5 causes twofold crossing of the light beam parts, whereby small diameter reproduction of a light ring required for dark field illumination becomes feasible.

We claim:

1. An incident light illumination apparatus having a light source for generating dark and light field illumination along an optical axis comprising:
   a. at least one optical component (9) located along said optical axis (18), having a first outer zone (9b) for dark field illumination beams (13) and a separate second inner zone (9a) for light field illumination beams (19), said second inner zone (9a) having a given reciprocal focal length different from said first outer zone (9b);
   b. a microscope objective (2) located along said optical axis;
   c. an annular lens (15) located along said optical axis and arranged to said objective for directing in parallel divergent portions of said dark field illumination beams;
   d. a sleeve (17) surrounding said object (2) and said annular lens (15) having an obtuse conical inner reflecting surface for directing said dark field illumination beams onto an object (14);
   e. a microscope saddle bracket (1) provided with a bore (4) located along said optical axis (18) between said optical component (9) and said microscope objective (2) with a body of rotation (5) having an inside reflecting surface (5a) located on said bore, said inside reflecting surface (5a) solely reproducing said dark field beams (13) as a light ring in a plane on the rear side of said microscope objective (2); and
   f. a splitting mirror (6) located along said optical axis (18) between said optical component (9) and said body of rotation (5).

2. The incident light illumination apparatus of claim 1, further comprising means for eliminating said light field illumination beams located along said optical axis in proximity to said optical component wherein said means for eliminating is a switchable light stop.

3. The incident light illumination apparatus of claim 2, wherein said body of rotation (5) is an ellipsoidal segment having one of the foci of said segment located in proximity to said first outer zone (9b) and said body of rotation has an axis of rotation continuous with said optical axis.

4. The incident light illumination apparatus of claim 2, wherein said body of rotation is circular.

5. The incident light illumination apparatus of claim 2, wherein said switchable light stop is between said light source and said optical component.

6. The incident light illumination apparatus of claim 2, wherein said switchable light stop is beteem said optical component and said body of rotation.